(12) United States Patent
Cronin et al.

(10) Patent No.: US 6,604,029 B2
(45) Date of Patent: Aug. 5, 2003

(54) MULTI-FUNCTION AIR DATA PROBES USING NEURAL NETWORK FOR SIDESLIP COMPENSATION

(75) Inventors: Dennis J. Cronin, Apple Valley, MN (US); Roger D. Foster, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 09/851,289

(22) Filed: May 8, 2001

(65) Prior Publication Data

US 2002/0169525 A1 Nov. 14, 2002

(51) Int. Cl.$^7$ .......................... G06F 15/18; G01C 21/00
(52) U.S. Cl. .............................. 701/6; 701/14; 73/182
(58) Field of Search .................. 701/6, 7, 14, 5, 701/220; 703/2; 700/89; 702/150, 138, 144; 706/16, 17, 21; 244/177; 73/861.66, 182, 180, 861.65

(56) References Cited

U.S. PATENT DOCUMENTS

| | | | |
|---|---|---|---|
| 3,318,146 A | | 5/1967 | DeLeo et al. |
| 4,096,744 A | | 6/1978 | DeLeo et al. ................. 73/180 |
| 4,303,978 A | * | 12/1981 | Shaw et al. ................. 364/453 |
| 4,378,696 A | | 4/1983 | DeLeo et al. ................. 73/180 |
| 4,378,697 A | | 4/1983 | DeLeo et al. ................. 73/182 |
| 5,205,169 A | | 4/1993 | Hagen ......................... 73/180 |
| 5,319,970 A | | 6/1994 | Peterson et al. ............. 73/182 |
| 5,423,209 A | | 6/1995 | Nakaya et al. ............... 73/182 |
| 5,485,412 A | | 1/1996 | Sarkkinen et al. ...... 364/724.05 |
| 5,610,845 A | * | 3/1997 | Slabinski et al. ........... 364/565 |
| 5,797,105 A | * | 8/1998 | Nakaya et al. ................ 701/7 |
| 5,901,272 A | * | 5/1999 | Schaefer, Jr. et al. ........ 395/22 |
| 6,253,166 B1 | * | 6/2001 | Whitmore et al. ............. 703/2 |

FOREIGN PATENT DOCUMENTS

| | | |
|---|---|---|
| DE | 44 10 709 A1 | 10/1995 |
| WO | WO 99/32963 | 1/1999 |

OTHER PUBLICATIONS

"BFGoodrich—Aircraft Sensors Division Air Data System with SmartProbe for Fairchiled Dornier 728JET", BFGoodrich—Rosemount Aerospace, Addendum to D9820217 Rev. B, Oct. 1998, pp. 1–10.

"SmartProbe™ Air Data System for Embraer ERJ–170 & 190", BFGoodrich—Aircraft Sensors Division, Proposal D9920133, Apr. 1999, pp. 1–65.

F.W. Hagen and Dr. H. Seidel, "Deutsche Airbus Flight Test of Rosemount Smart Probe for Distributed Air Data System", IEEE AES Systems Magazine, Apr. 1994, pp 7–14.

Bulletin 1013, "Pitot and Pitot–Static Probes", BFGoodrich (May 1998).

T.J. Rohloff, S.A. Whitmore and I. Catton, "Air Data Sensing from Surface Pressure Measurements Using a Neural Network Method", AIAA Journal, vol. 36, No. 11, Nov. 1998, pp. 2095–2101.

(List continued on next page.)

Primary Examiner—Tan Q. Nguyen
Assistant Examiner—Dalena Tran
(74) Attorney, Agent, or Firm—Westman, Champlin & Kelly, P.A.

(57) ABSTRACT

An air data sensing probe such as a multi-function probe includes a barrel having multiple pressure sensing ports for sensing multiple pressures. Instrumentation coupled to the pressure sensing ports provides electrical signals indicative of the pressures. An inertial navigation system input of the probe receives electrical signals indicative of inertial navigation data for the aircraft. A neural network of the probe receives as inputs the electrical signals indicative of the multiple pressures and the electrical signals indicative of the inertial navigation data. The neural network is trained or configured to provide as an output, electrical signals indicative of an air data parameter.

10 Claims, 5 Drawing Sheets

OTHER PUBLICATIONS

T.J. Rohloff, S.A. Whitmore and I. Catton, "Fault–Tolerant Neural Network Algorithm for Flush Air Data Sensing", Journal of Aircraft, vol. 36, No. 3, May–Jun. 1999, pp. 541–549.

T.J. Rohloff and I. Catton, "Fault Tolerance and Extrapolation Stability of a Neural Network Air–Data Estimator", Journal of Aircraft, vol. 36, No. 3, May–Jun. 1999, pp. 571–576.

"What is an Aircraft Neural Network?", Battelle Memorial Institute (Copyright 1997), (Publication at least by Apr. 9, 2001), http://www.emsl.pnl.gov:2080/proj/neuron/neural/what.html.

C. Stergiou, "What is a Neural Network?", (Publication at least by Apr. 9, 2001), http://www.doc.ic.ac.uk/_nd/surprise_96/journal/voll/csll/articles1.html.

D. Clark, "An Introduction to Neural Networks", Copyright 1991, 1997) (Publication at least by Apr. 9, 2001), http://members.home.net/neuralnet/introtonn/index.htm.

* cited by examiner

FIG._1

FRONT VIEW

FIG._2A

SIDE VIEW

FIG._5

MULTI-FUNCTION AIR DATA PROBES USING NEURAL NETWORK FOR SIDESLIP COMPENSATION

CROSS-REFERENCE TO RELATED APPLICATION

Cross reference is made to U.S. application Ser. No. 09/850,863, entitled "METHOD TO CALCULATE SIDESLIP ANGLE AND CORRECT STATIC PRESSURE FOR SIDESLIP EFFECTS USING INERTIAL INFORMATION," filed on May 8, 2001, U.S. application Ser. No. 09/851,485, entitled "ITERATIVE METHOD OF AIRCRAFT SIDESLIP COMPENSATION FOR MULTI-FUNCTION PROBE AIR DATA SYSTEMS," filed on May 8, 2001, and U.S. application Ser. No. 09/850,796, entitled "SIDESLIP CORRECTION FOR A MULTI-FUNCTION THREE PROBE AIR DATA SYSTEM," filed on May 8, 2001.

BACKGROUND OF THE INVENTION

The present invention relates to air data systems that provide accurate compensation of sideslip of an air vehicle utilizing independent probes that are not pneumatically coupled, but which have processors for interchanging electrical signals between the probes. These probes are sometimes referred to as multi-function probes (MFPs). One type of MFP is the SmartProbe™ sold by B.F. Goodrich Company. Multi-function probes include processing circuitry located at the probe itself as part of its instrument package. During sideslip of the air vehicle, compensation of various local (to the probes) parameters or signals, such as angle of attack and static pressure, is necessary for accurate determination of aircraft angle of attack and other aircraft parameters including determination of altitude from static pressure or other means. This requirement for accuracy in altitude indications is particularly important in Reduced Vertical Separation Minimum (RVSM) space areas of the air traffic control system.

In conventional air data systems, probes on opposite sides of an aircraft can be pneumatically connected so that the pressure signals are averaged between the right side of the aircraft and the left side of the aircraft to provide a static pressure that is "nearly true". In most conventional systems, although corrections are made for Mach number and aircraft angle of attack, it is rare that neglecting sideslip effect will introduce enough error to warrant a correction based on sideslip for the cross coupled probes.

However, MFPs are connected only electrically in order to eliminate the need for pneumatic tubing passing between the opposite sides of the aircraft or between probes on the same side of the aircraft. This means that each probe is pneumatically independent, even if it is electrically communicating with other probes. In the RVSM space, there is a need for dual redundant systems for static pressure estimation. While information can easily be exchanged between the processing circuitry of different probes, the need for determining sideslip effect remains. Computational fluid dynamic analysis has shown that position errors can be up to 600 feet per degree of sideslip under typical RVSM space flight conditions at, for example, 41,000 feet and a Mach number of 0.8. It is thus apparent that the sideslip effect must be corrected to obtain the necessary accuracy for certification by aviation authorities.

While the need exists for providing redundant systems for static pressure estimation in the RVSM space, it is also desirable to reduce the number of probes on the exterior of the aircraft. Typically, redundancy is provided using four probes, with two probes positioned on each side of the aircraft. Elimination of one or more of these probes potentially reduces the redundancy available in the system. Reducing the number of probes while maintaining the desired redundancy thus presents a problem.

SUMMARY OF THE INVENTION

The present invention relates to multi-function air data sensing systems which provide for redundancy in correcting for sideslip of an aircraft arriving at various air data parameters, such as aircraft angle of attack, static pressure or pressure altitude, and Mach number. Aerodynamic sideslip is a measure of the magnitude of a cross component of airspeed to the forward component of airspeed. Compensation information exchanged between probes such as MFPs, for example differential and local angle of attack between the two sides of an aircraft, can provide an indication of sideslip effect. Using values of local angle of attack provides information that corresponds to aircraft parameters or variables of angle of attack and angle of sideslip. In accordance with embodiments of the invention disclosed herein, a neural network is used to provide sideslip compensated air data parameters, using as inputs both pressure information sensed by the corresponding air data probe and inertial yaw angle or angle rate information provided by an inertial navigation system. Using the inertial information and a trained neural network, redundancy in air data parameter calculation can be provided, thus potentially reducing the number of probes.

An air data sensing probe or MFP of the invention includes a barrel having multiple pressure sensing ports for sensing multiple pressures. Instrumentation coupled to the pressure sensing ports provides electrical signals indicative of the pressures. An inertial navigation system input of the probe receives electrical signals indicative of inertial navigation data for the aircraft. A neural network of the probe receives as inputs the electrical signals indicative of the multiple pressures and the electrical signals indicative of the inertial navigation data. The neural network is trained or configured to provide as an output electrical signals indicative of an air data parameter compensated for sideslip conditions.

DETAILED DESCRIPTION OF THE PREFERRED EMBODIMENTS

Figure 1:
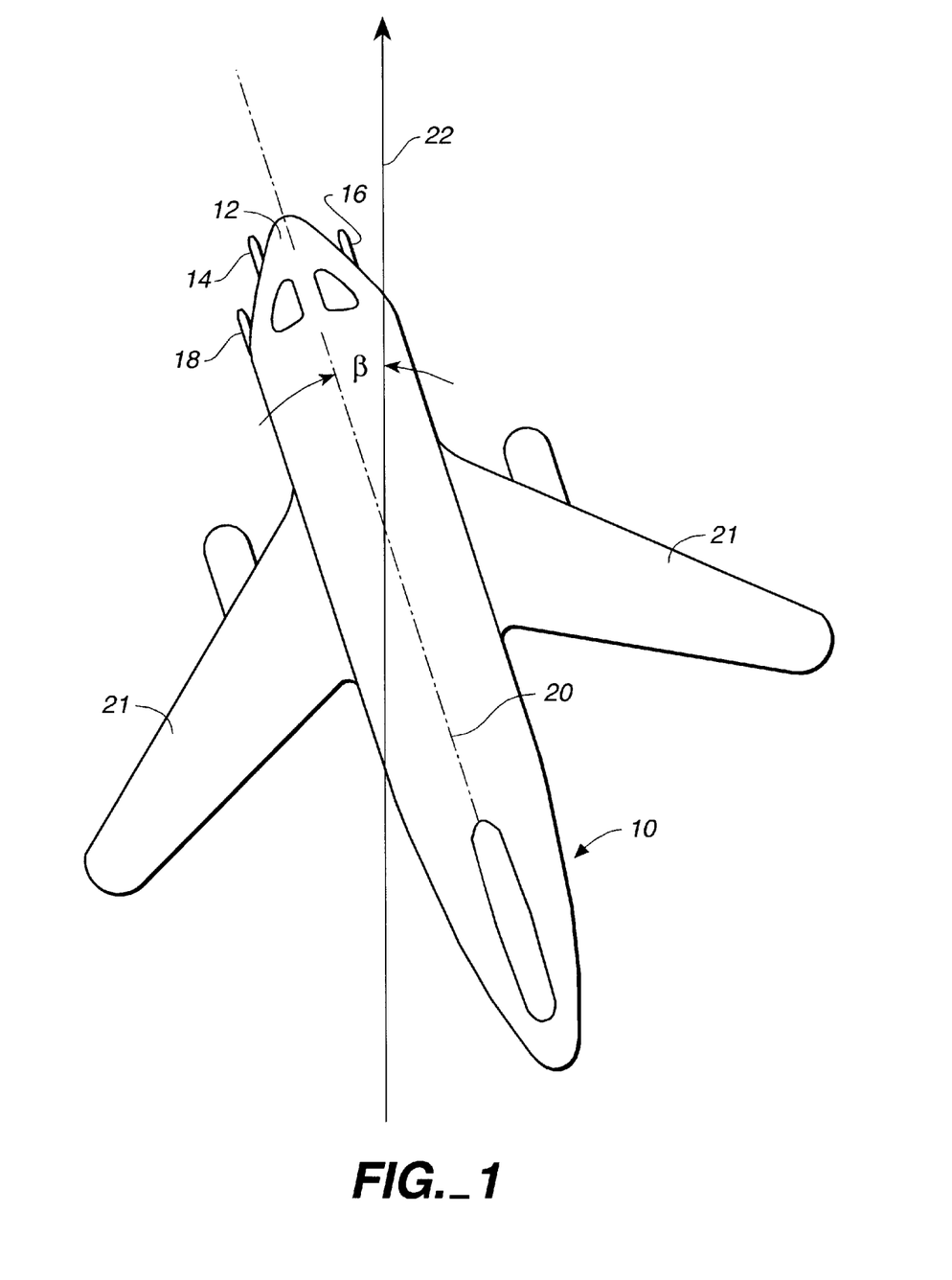
FIG. 1 is a top plan view of an aircraft illustrating a sideslip condition.

Referring to FIG. 1, an aircraft indicated generally at 10 is shown with a nose portion 12. Mounted air data sensing probes or MFPs are indicated schematically and generally at 14, 16 and 18. The positioning of aircraft 10 is with respect to a center plane or center line 20 that is perpendicular to the normal plane of the wings 21. Center line 20 is shown in a greatly exaggerated sideslip condition where the path of travel of aircraft 10 is indicated at 22, and where there is a substantial angle β between the path of travel line 22 and the line or plane 20. Angle β is the aircraft angle of sideslip, which is defined herein as an aircraft parameter. Other aircraft parameters or air data parameters include angle of sideslip static pressure and Mach number, for example. The aircraft essentially is yawing to the left in FIG. 1. Aircraft angle of sideslip β is very close to a yaw angle $Y_i$ (not shown) as measured by an inertial navigation system. As the airflow passes across the aircraft, the probes 14 and 18 will be subjected to different flow conditions, insofar as the angle of wind and local static pressure is concerned, than is the probe 16.

Another aircraft parameter is the aircraft angle of attack. It also can be envisioned that if the aircraft changes angle of attack, because of the yaw angle, the amount of change in pressure on one side of the aircraft would be different than that on the other side of the aircraft. When the probes are only electrically connected together, there is no way of simply averaging these changes to obtain a correct static pressure reading. A predicted angle of sideslip value can be used as a correction factor to compensate for this angle.

Figure 2A:
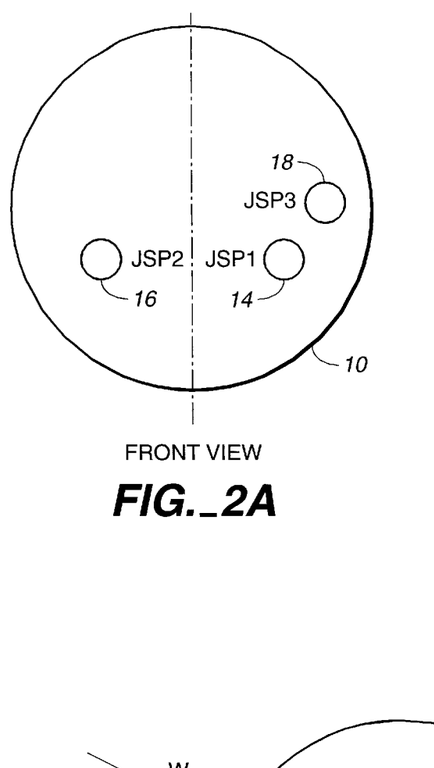
FIGS. 2A and 2B are a schematic cross sectional front representation and a schematic side view, respectively, of a nose portion of an aircraft showing placement of air data sensing probes, such as multi-function probes (MFPs), in one configuration.
Figure 2B:
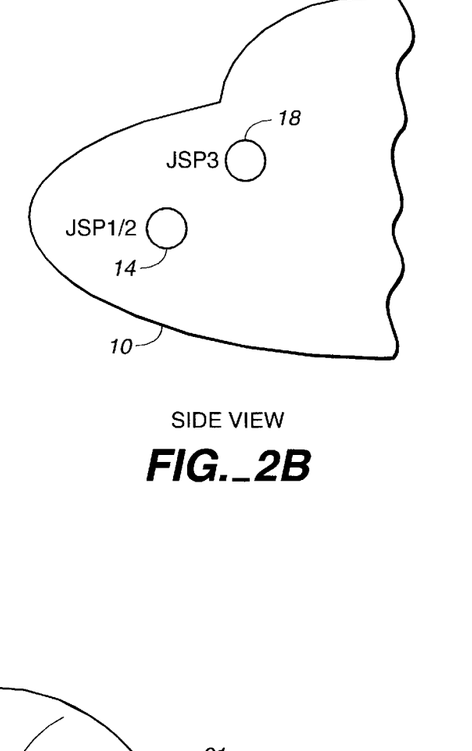

FIGS. 2A and 2B diagrammatically illustrate a typical arrangement of the MFPs 14, 16 and 18 shown in FIG. 1, from a front view and side view of the aircraft 10. These probes measure pitot pressure $P_t$, and angle of attack pressures comprising $P\alpha_1$ and $P\alpha_2$ and deliver local static pressure and local angle of attack information.

Probes 14 and 16 are symmetrically located, and on the same "water level" or vertical height on the aircraft, so that they are in identical positions. The effect of sideslip can be compensated, with probes that are symmetrically located such as probes 14 and 16 by electrically averaging the outputs, and used for providing a calculated static pressure. However, probe 18 is affected differently in sideslip conditions than either one of probes 14 or 16, so compensation has to be separately provided if a redundant system is to be developed utilizing probe 18. The redundancy provided in the present invention utilizes a neural network within one or more of the probes to provide the compensation. For example, a neural network can be included within any or each of probes 14, 16 and 18 to provide redundancy for the system as a whole. In other embodiments, the neural network can be included in an air data computer (ADC) coupled to, but located remotely from, the probes.

An MFP or an air data probe is defined herein as a probe in which a computer or processing circuitry is integrally attached to the probe, and the sensing portions of the probe itself protrude in the airstream that moves past the aircraft skin. The processing circuitry is in an integrated housing immediately inside the skin. The outputs from the probes can include digital electrical signals representing pressures derived from sampling the pressure readings from internal pressure sensors. The internal pressure sensors of the probes can be either differential sensors or absolute sensors that receive the pressure signals and convert them into electrical signals that are then digitized. In accordance with the invention, the processing circuitry of an MFP (or other similar air data sensing probe) includes a neural network trained or configured to provide sideslip compensated air data parameters in response to a particular combination of inputs.

The probes 14, 16 and 18 may be probes similar to those shown in the U.S. Pat. No. 4,378,696, or other similar patents. As shown schematically in FIG. 3, the probes have barrels 14A, 16A and 18A, with suitable ports for sensing pitot pressure (or total pressure) $P_t$ at leading ends of the probes indicated at 14B, 16B and 18B. The angle of attack sensing ports are placed on the top and bottom of the probes, and the top ports are illustrated schematically at 14C, 16C and 18C. Mating ports (14E, 16E and 18E not shown in FIG. 3) are on the lower portion, as is well known, for measuring the angle of attack by sensing the differentials in pressure between the upper port and the lower port. The lower angle of attack pressure port on the probes will sense a pressure designated $P\alpha_1$, and the upper angle of attack pressure ports shown at 14C, 16C and 18C sense a pressure designated $P\alpha_2$. Each of the probes 14, 16 and 18 is provided with a separate instrument housing 14D, 16D and 18D, respectively. While probes 14, 16 and 18 are shown in FIGS. 1, 2A and 2B, air data systems of the present invention can, in some embodiments, only include two probes such as probes 14 and 16 or probes 16 and 18.

Figure 3:
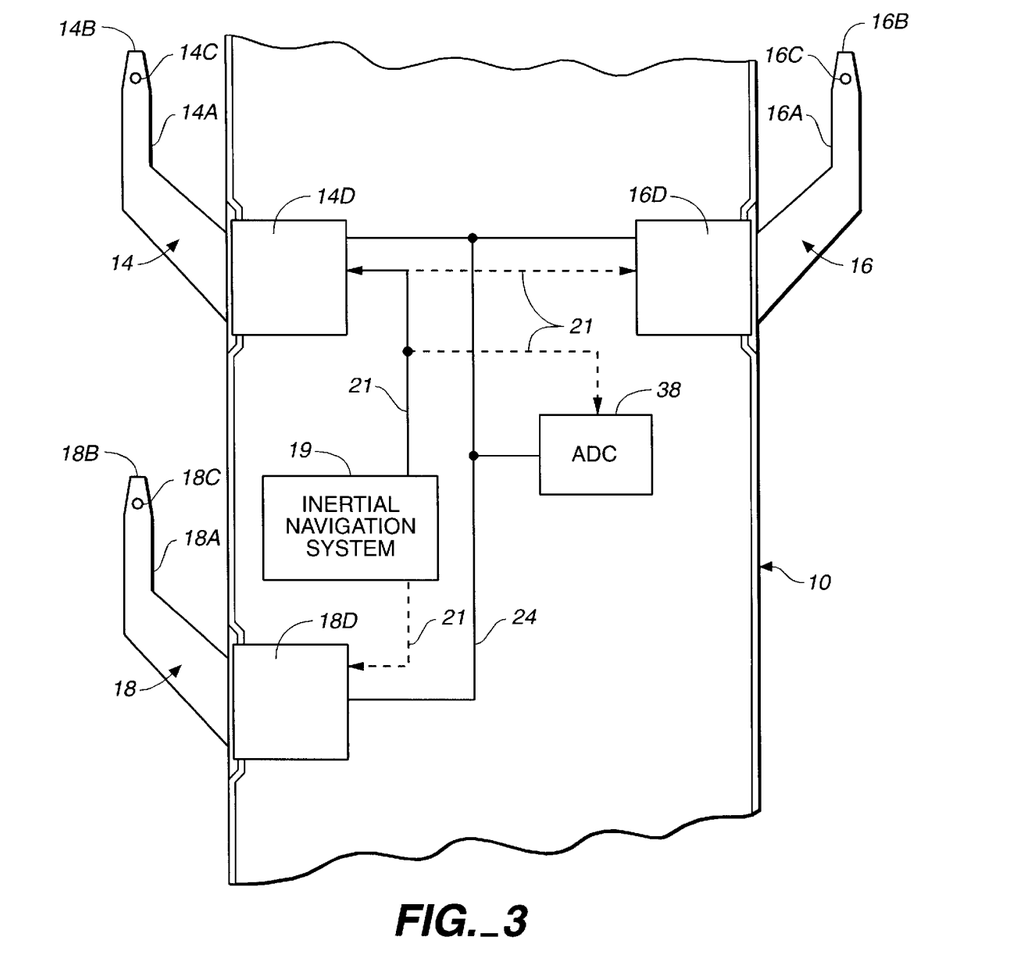
FIG. 3 is a schematic representation of a cross section of a nose portion of an aircraft showing placement of the probes configured to function with an inertial navigation system in accordance with the present invention.

As shown in FIG. 3, the electronics within instrument housings 14D, 16D and 18D are electrically coupled via electrical connection 24. Electrical connection 24 can be a data bus, electrical cables, or other types of communication pathways for communicating information in the form of electrical signals. Also shown in FIG. 3 is an optional remote ADC 38 within which the neural networks used in the present invention can be implemented. However, in other embodiments of the invention, the neural networks are implemented within the processing circuitry contained within the housings 14D, 16D and/or 18D associated with one or more of probes 14, 16 and 18. In these embodiments, optional ADC 38 can be omitted if desired.

In accordance with the invention, a neural network is trained using Computational Fluid Dynamics, wind tunnel, flight test data, or by other methods. The neural network receives at input 21 inertial navigation data $IRU_i$, for example electrical signals representing a yaw angle $Y_i$, from an inertial navigation system 19. For purposes of discussion, it is assumed that the inertial data is provided to each of probes 14, 16 and 18. However, the dashed lines 21 in FIG. 3 are indicative of the fact that in other embodiments the inertial data can be provided to a neural network in a single probe, for example probe 14 (solid line). In fact, other inertial navigation systems 19 could exist for each probe although it is shown that a single source of inertial data is available. Each system comprising a neural network may require data from a single probe 14, 16, or 18 and a single inertial navigation system 19.

Figure 4:
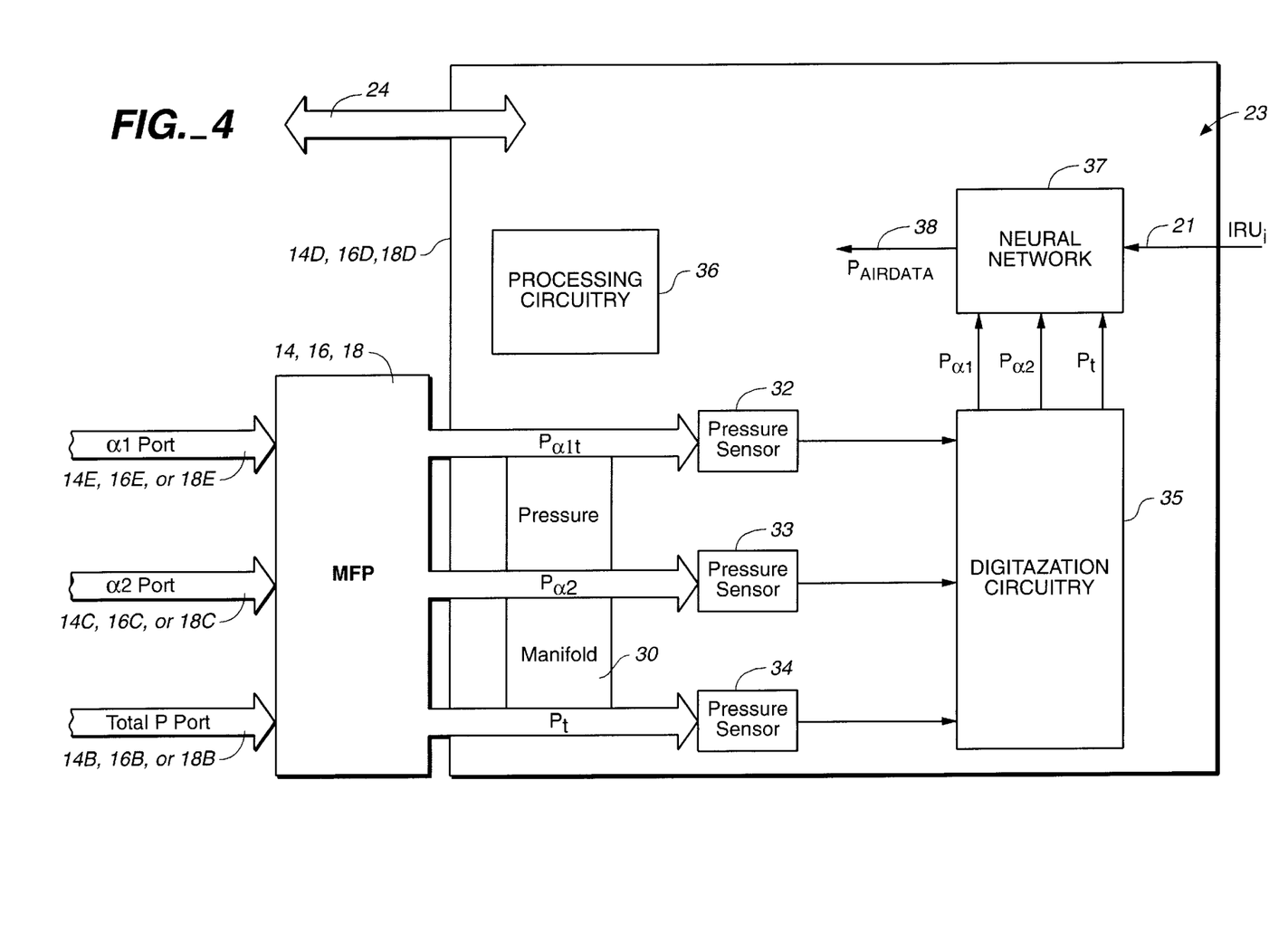
FIG. 4 is a block diagram illustrating circuitry of one or more of the probes, with the circuitry including a neural network in embodiments of the invention.

The arrangement of the circuitry in one example embodiment of an air data sensing probe of the invention is shown in block diagram form in FIG. 4. Circuitry 23 is shown schematically coupled to one of probes (14, 16 or 18) which are labeled as multi-function probes. Circuitry 23 is positioned within the corresponding housing 14D, 16D or 18D, and in the illustrated embodiment includes a neural network 37. Inputs are illustrated schematically as the $\alpha_1$ pressure port 14E, 16E or 18E, the $\alpha_2$ pressure port 14C, 16C or 18C, and the total pressure port 14B, 16B or 18B. The $\alpha_2$ pressure port and total pressure port correspond to those shown in FIG. 3 for probes 14, 16 and 18. The $\alpha_1$ pressure port corresponds to the lower port (not shown in FIG. 3) on the probes.

These pressures are transmitted through a manifold 30 to individual pressure sensors 32, 33 and 34, respectively. The outputs of pressure sensors 32, 33 and 34, which may be absolute pressure sensors or differential pressure sensors, are provided to analog-to-digital converter 35 for digitization. Processing circuitry 36 can include a microcontroller and related memory and communications circuits all forming part of the MFP circuitry 23. The MFP circuitry can also include other circuits and devices such as electromagnetic filters for reducing EMI interference, heater control circuits, and power supplies. Circuitry 23 also includes and/or is coupled to data bus 24 for receiving information from, or transmitting information to, other probes in the system.

As discussed above, processing circuitry 36 also includes or implements a neural network 37 which receives the electrical signals corresponding to pressures $P\alpha_1$, $P\alpha_2$, and $P_t$ as inputs. Neural network 37 also receives inertial navigation data or electrical signals $IRU_i$, at inputs 21, for example corresponding to an inertially determined yaw angle $Y_i$. Inertial navigation data IRU can also represent other inputs such as one or more of roll angle, pitch rate, lateral acceleration or other variables which are contributors to an accurate representation of the aerodynamic sideslip effect.

Aerodynamic sideslip is a measure of the magnitude of the cross-component of air speed to the forward component of air speed. Inertial navigation measures of yaw angle are very nearly that of aerodynamic sideslip at high forward speeds. Inertial measures of yaw only account for the orientation of the aircraft, not the wind speed. In the present invention, inertial yaw information and/or other navigation data is used to compensate for static pressure residual errors, allowing a three probe system to be used rather than a four probe system, while maintaining the necessary redundancy.

In accordance with the invention, neural network 37 uses the three pressure inputs from a single probe ($P_t$, $P_{\alpha 1}$ and $P_{\alpha 2}$), as well as the inertial yaw or inertial data $IRU_i$ to determine a single air data parameter such as global Mach number M, aircraft angle of attack, or pressure altitude, for example. The local values read by the three pressures at a probe depend upon the local Mach number $M_1$, the local angle of attack $\alpha_1$, and the local static pressure $p_1$. However, it is flight conditions (aircraft Mach number, aircraft angle of attack, aircraft altitude and aircraft sideslip) that dictate those local conditions. Also, if the pressures are not corrected for temperature, temperature can be used as an input variable to neural network 37 as well.

Neural network 37 can be any of a number of known neural network architectures. For example, neural network 37 can be a feed-forward architecture, a cascade architecture, a three-layer architecture, or other types of neural networks. The training of neural network 37 to establish the necessary threshold gate weights and other parameters can be accomplished in a wind tunnel simulation, using previously obtained simulation data, wind tunnel data, or by other means including flight testing.

Figure 5:
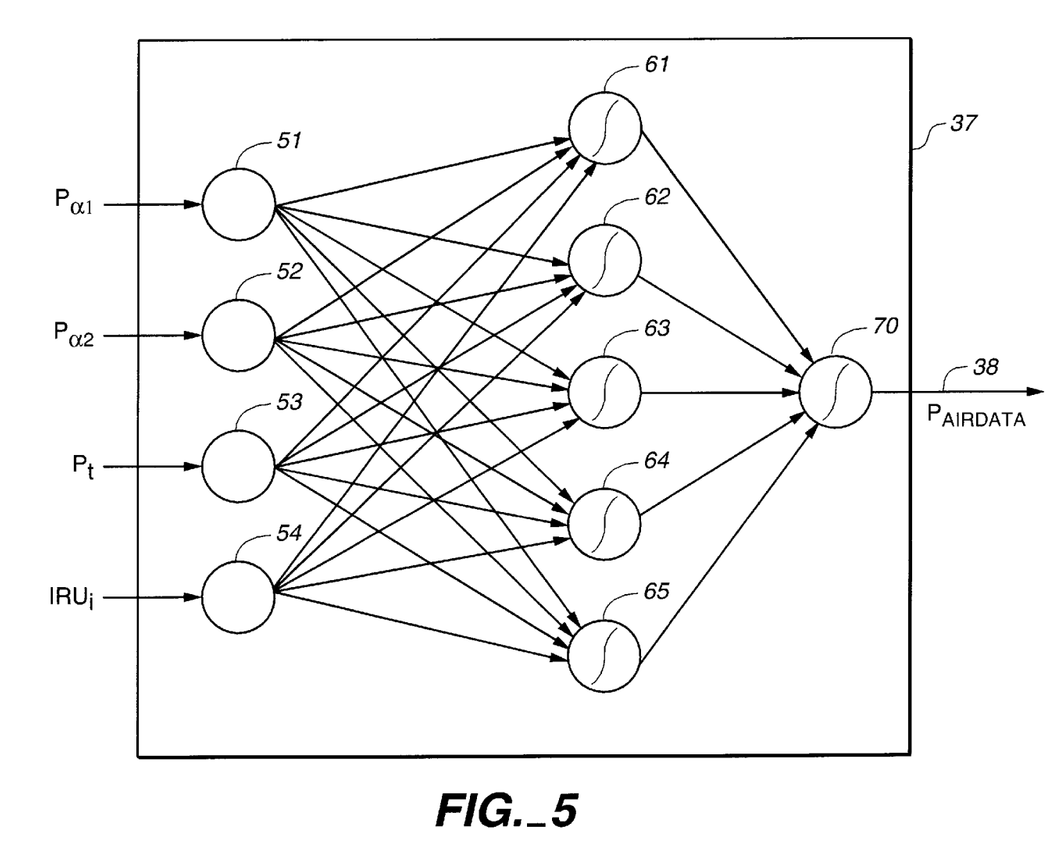
FIG. 5 is a diagrammatic illustration of the neural network shown in FIG. 4 in accordance with one embodiment of the invention.

FIG. 5 is a schematic illustration which generically represents a neural network receiving the inputs as described above, and providing an air data or aircraft parameter 38. Separate neural networks can be developed based on training data for a number of appropriate air data parameters including, but not limited to aircraft Mach number, true static pressure, aircraft angle of attack, aircraft angle of sideslip, and aircraft altitude rate. Artificial neural networks are computer programs that simulate biological neural networks. Artificial neural networks such as neural network 37 are unlike artificial intelligence programs in that, instead of using deductive reasoning to apply known rules to situations to produce outputs, artificial neural networks automatically construct associations based upon the results of known situations (i.e., combinations of inputs and outputs). In training, neural networks such as network 37 automatically adjust themselves and eventually generalize associations.

Once neural network 37 is constructed and trained (by being presented with historical cause and effect situations) in a wind tunnel simulation, using other simulated data, or flight test data, the network 37 then shapes itself to build an internal representation of the governing rules. Later, after artificial neural network 37 is trained and is in use in one of the air data probes, it can be presented with various combinations of inputs to produce a real event result. In other words, neural network 37 will be trained to produce particular air data parameter values at output 38 in response to specific combinations of angle of attack pressures, pitot pressure and inertial reference inputs. Further inputs to neural network 37 can include, for example, pressure time-rate of change information in embodiments of the invention.

Shown in FIG. 5 is a generic illustration of the concept of a neural network. The illustration is not intended to limit the invention to any particular type of neural network, nor to the number of inputs or layers of the neural network. As illustrated in FIG. 5, each of the inputs to neural network 37 is provided to an input node (input nodes 51, 52, 53 and 54 are illustrated). From the input node, each of the inputs is then provided to each of multiple threshold gates (threshold gates 61, 62, 63, 64 and 65 are shown). In turn, the outputs of each of these threshold gates can be provided to one or more additional threshold gates (threshold gate 70 is shown) in one or more additional layers of the neural network. In training, the neural network determines weights or multiplication factors to apply to each input of a particular threshold gate in order to establish a set of rules which will generate the appropriate output 38 based upon the training of neural network 37.

Figure 6:
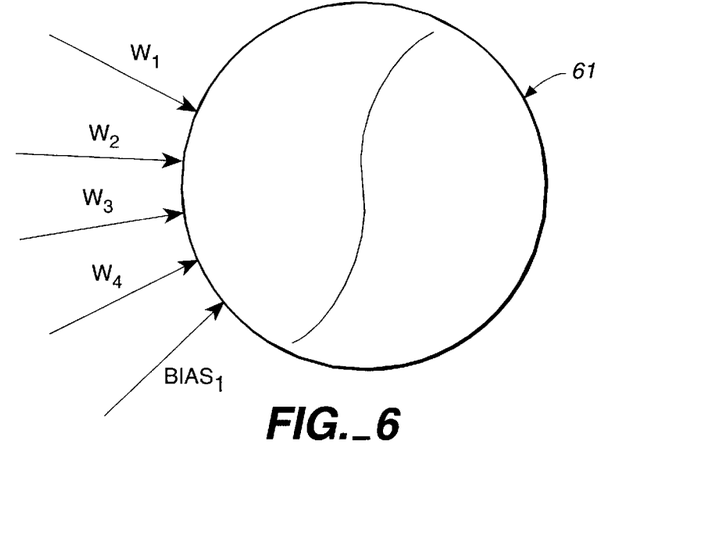
FIG. 6 is a diagrammatic illustration of a node or threshold gate of the neural network.

FIG. 6 illustrates four separate weights ($W_1$, $W_2$, $W_3$ and $W_4$) applied to one node or threshold gate (gate 61) of neural network 37. Also illustrated is a bias ($Bias_1$) which is associated with gate or node 61. Each node in network 37 can have its own unique bias as well as its own unique set of weights applied to its inputs.

Although the present invention has been described with reference to preferred embodiments, workers skilled in the art will recognize that changes may be made in form and detail without departing from the spirit and scope of the invention. For example, inputs to the neural network can include inertial or navigational inputs such as pitch, yaw, roll rates, lateral acceleration, lateral forces, lateral force derivatives, dynamic pressure rise, rudder deflections, and others. The term inertial navigation data can be interpreted to include these and other flight parameters. Further, the present invention includes the use of a neural network in this manner in other types of MFPs. Therefore, the phrases air data probes and MFPs should also be interpreted to include any type of MFP capable of delivering local Mach, angle of attack, and static pressure.

What is claimed is:

1. An air data sensing probe comprising:

a barrel having a plurality of pressure sensing ports for sensing a plurality of pressures;

instrumentation coupled to the plurality of pressure sensing ports for providing electrical signals indicative of the plurality of pressures;

an inertial navigation system input for receiving electrical signals indicative of inertial navigation data for the aircraft; and a neural network coupled to the instrumentation and the inertial navigation system input, the neural network configured to receive as inputs the electrical signals indicative of the plurality of pressures and the electrical signals indicative of the inertial navigation data, and in response the neural network configured to provide as an output electrical signals indicative of an air data parameter.

2. The air data sensing probe of claim 1, wherein the plurality of pressure sensing ports on the barrel include first and second angle of attack sensing ports for sensing first and second angle of attack pressures $P\alpha_1$ and $P\alpha_2$, respectively, and wherein the electrical signals indicative of the plurality of pressures include electrical signals indicative of the first and second angles of attack pressures $P\alpha_1$ and $P\alpha_2$.

3. The air data sensing probe of claim 2, wherein the plurality of sensing ports on the barrel include a pitot sensing port for sensing a pitot pressure $P_t$, and wherein the electrical signals indicative of the plurality of pressures include electrical signals indicative of the pitot pressure $P_t$.

4. The air data sensing probe of claim 3, wherein the electrical signals indicative of inertial navigation data for the aircraft include electrical signals indicative of inertial yaw angle $Y_i$ of the aircraft, and thereby indicative of an aircraft angle of sideslip $\beta$.

5. The air data sensing probe of claim 3, wherein the electrical signals indicative of inertial navigation data for the aircraft include electrical signals indicative of inertial angle rate information of the aircraft, and thereby indicative of an aircraft angle of sideslip $\beta$.

6. The air data sensing probe of claim 3, wherein the neural network is configured to provide as the output electrical signals indicative of a global Mach number M for the aircraft.

7. The air data sensing probe of claim 3, wherein the neural network is configured to provide as the output electrical signals indicative of an aircraft angle of attack.

8. The air data sensing probe of claim 3, wherein the neural network is configured to provide as the output electrical signals indicative of an aircraft angle of sideslip.

9. The air data sensing probe of claim 3, wherein the neural network is configured to provide as the output electrical signals indicative of true static pressure.

10. The air data sensing probe of claim 3, wherein the neural network is configured to provide as the output electrical signals indicative of altitude rate information.

* * * * *